(12) United States Patent
Kulkarni et al.

(10) Patent No.: US 10,860,104 B2
(45) Date of Patent: Dec. 8, 2020

(54) AUGMENTED REALITY CONTROLLERS AND RELATED METHODS

(71) Applicant: Intel Corporation, Santa Clara, CA (US)

(72) Inventors: Shantanu Kulkarni, Hillsboro, OR (US); Saara Kamppari-Miller, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/186,105

(22) Filed: Nov. 9, 2018

(65) Prior Publication Data

US 2019/0094966 A1    Mar. 28, 2019

(51) Int. Cl.
| | |
|---|---|
| *G06F 3/01* | (2006.01) |
| *G06T 19/00* | (2011.01) |
| *G06N 20/00* | (2019.01) |
| *G06F 1/16* | (2006.01) |

(52) U.S. Cl.
CPC .............. *G06F 3/015* (2013.01); *G06F 1/163* (2013.01); *G06F 3/017* (2013.01); *G06N 20/00* (2019.01); *G06T 19/006* (2013.01)

(58) Field of Classification Search
CPC ......... G08B 21/18; G06F 3/015; G06F 1/163; G06F 3/017; G06T 19/006
See application file for complete search history.

(56) References Cited

U.S. PATENT DOCUMENTS

| | | | |
|---|---|---|---|
| 5,736,986 | A | 4/1998 | Sever, Jr. |
| 5,774,591 | A | 6/1998 | Black et al. |
| 7,946,974 | B2 | 5/2011 | Lordereau |
| 8,392,250 | B2 | 3/2013 | Pradeep et al. |
| 8,396,744 | B2 | 3/2013 | Pradeep et al. |
| 8,467,133 | B2 | 6/2013 | Miller |
| 8,477,425 | B2 | 7/2013 | Border et al. |
| 9,282,893 | B2 | 3/2016 | Longinotti-Buitoni et al. |
| 9,477,313 | B2 | 10/2016 | Mistry et al. |

(Continued)

OTHER PUBLICATIONS

Laput, G. et al., "Synthetic Sensors: Towards General-Purpose Sensing," video provided by Future Interfaces Group, Carnegie Mellon University, available at https://www.youtube.com/watch?v=aqbKrrru2co, published May 9, 2017, last accessed Nov. 9, 2018, 1 page (website printout provided).

(Continued)

*Primary Examiner* — Abbas I Abdulselam
(74) *Attorney, Agent, or Firm* — Hanley, Flight & Zimmerman, LLC

(57) ABSTRACT

Example augmented reality controllers and related methods are disclosed herein. An example wearable device for controlling digital reality content includes a frame sized to fit around a neck of a user and a first sensor coupled to a first portion of the frame. The first sensor is to generate biosensor data for the user wearing the frame. The example wearable device includes a second sensor coupled to a second portion of the frame. The second sensor is to generate second sensor data different from the biosensor data. One or more of the biosensor data or the second sensor data is to be used by a processor in communication with the first sensor and the second sensor to control the digital reality content.

21 Claims, 8 Drawing Sheets

(56) References Cited

U.S. PATENT DOCUMENTS

| | | | |
|---|---|---|---|
| 9,569,001 | B2 | 2/2017 | Mistry et al. |
| 9,830,894 | B1 | 11/2017 | Ma et al. |
| 2004/0018476 | A1 | 1/2004 | LaDue |
| 2005/0216243 | A1 | 9/2005 | Graham et al. |
| 2006/0119574 | A1 | 6/2006 | Richardson et al. |
| 2006/0250322 | A1 | 11/2006 | Hall et al. |
| 2008/0065468 | A1 | 3/2008 | Berg et al. |
| 2008/0215975 | A1 | 9/2008 | Harrison et al. |
| 2009/0172146 | A1 | 7/2009 | Bates et al. |
| 2013/0024272 | A1 | 1/2013 | Pradeep et al. |
| 2013/0050432 | A1 | 2/2013 | Perez et al. |
| 2013/0228062 | A1 | 9/2013 | Tabata |
| 2013/0236869 | A1 | 9/2013 | Sakazaki |
| 2013/0239782 | A1 | 9/2013 | Yoshihama |
| 2013/0239784 | A1 | 9/2013 | Tabata |
| 2013/0239785 | A1 | 9/2013 | Tabata |
| 2014/0028850 | A1 | 1/2014 | Keating et al. |
| 2014/0129935 | A1 | 5/2014 | Ovadia Nahon et al. |
| 2014/0184475 | A1 | 7/2014 | Tantos et al. |
| 2014/0225931 | A1 | 8/2014 | Plagemann et al. |
| 2015/0143976 | A1 | 5/2015 | Katto et al. |
| 2015/0358543 | A1 | 12/2015 | Kord |
| 2015/0370320 | A1 | 12/2015 | Connor |
| 2016/0203806 | A1 | 7/2016 | Hardi et al. |
| 2017/0209786 | A1 | 7/2017 | Zhu et al. |
| 2017/0231490 | A1 | 8/2017 | Toth et al. |
| 2017/0255019 | A1* | 9/2017 | Lyons ............... G02B 27/0172 |
| 2017/0330539 | A1 | 11/2017 | Little et al. |
| 2017/0359635 | A1* | 12/2017 | Aumer .................. G08B 21/18 |
| 2018/0060946 | A1* | 3/2018 | Devries ............. G06Q 30/0643 |
| 2018/0107278 | A1 | 4/2018 | Goel et al. |
| 2018/0310062 | A1* | 10/2018 | Carnevale .......... G06K 9/00302 |
| 2018/0338720 | A1* | 11/2018 | Gupta ................. A61B 5/6824 |
| 2019/0171975 | A1* | 6/2019 | Kurian .................... G06K 9/60 |
| 2019/0282175 | A1* | 9/2019 | Hill ....................... B25J 9/1694 |

OTHER PUBLICATIONS

Website homepage for Openwater, available at https://www.openwater.cc, last accessed Oct. 3, 2018, 1 page.

Hudlicka, Eva, "To Feel or Not to Feel: The Role of Affect in Human-Computer Interaction," International Journal of Human-Computer Studies, vol. 59, Issues 1-2, Jul. 2003, 32 pages.

Jaimes et al., "Multimodal Human-Computer Interaction: A survey," Computer Vision and Image Understanding, vol. 108, Issues 1-2, Oct.-Nov. 2007, 19 pages.

"Beyond the Jam," Nintendo Wii Music, Jul. 21, 2018, retrieved from the Internet: <http://www.nintendo.com/games/detail/Fe0_TFVoa6RbkoZq_GolDaRTgOzVAOID.com> 4 pages.

\* cited by examiner

AUGMENTED REALITY CONTROLLERS AND RELATED METHODS

FIELD OF THE DISCLOSURE

This disclosure relates generally to user controllers and, more particularly, to augmented reality controllers and related methods.

BACKGROUND

Augmented reality overlays digital information in the real world. For example, using a user device such as a smart phone or a wearable device such as glasses, a user can view virtual data such as graphical user interface menus, navigation information, virtual characters, etc. and/or hear audio data, where the digital information appears to be integrated into and/or overlaying the real-world environment.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
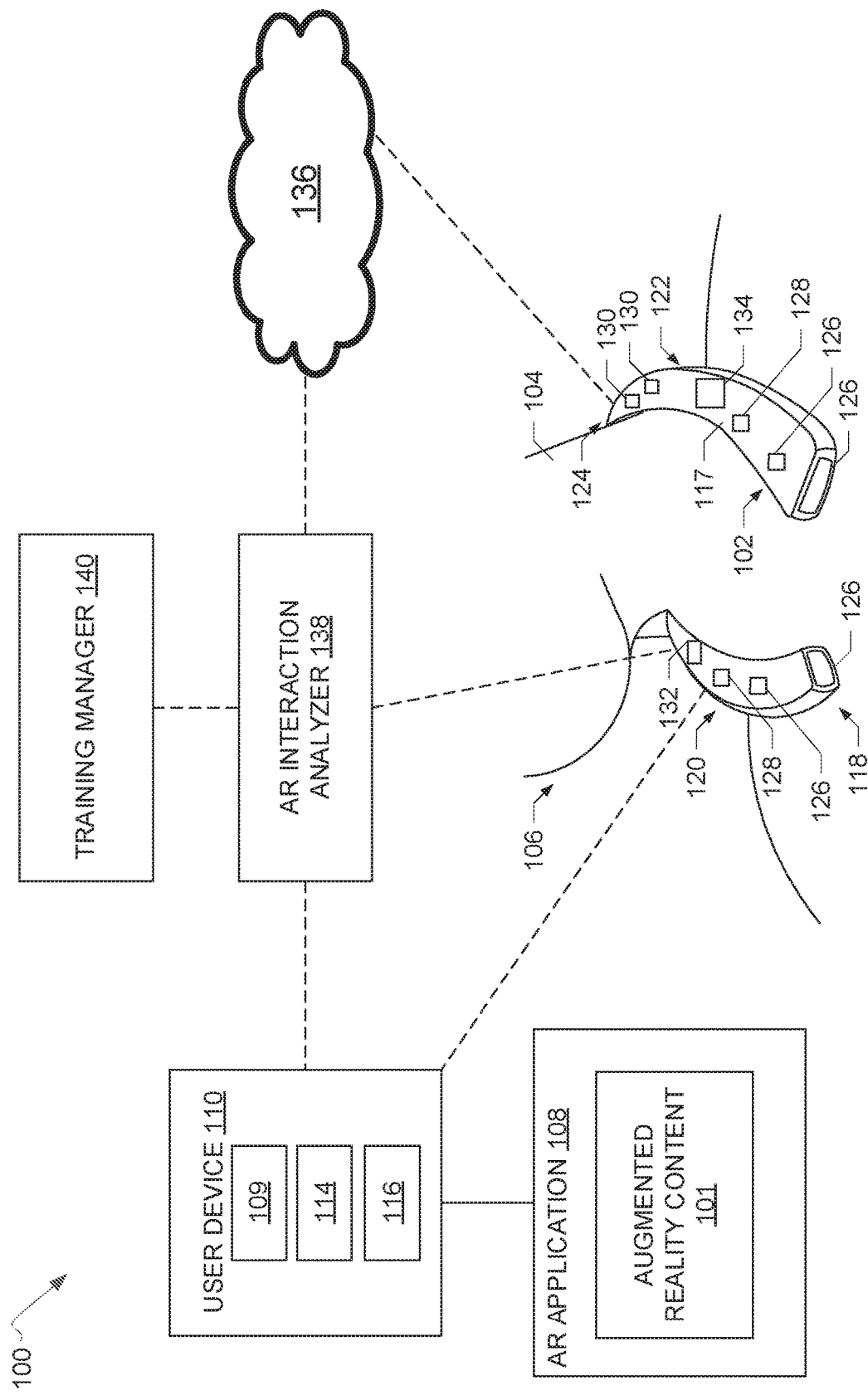
FIG. 1 illustrates an example system constructed in accordance with teachings of this disclosure and including an example wearable augmented reality controller, an example training manager, and an example augmented reality interaction analyzer for identifying user interactions with augmented reality content.

Augmented reality (AR) overlays digital information in the real world. For example, using a user device such as a smart phone or a wearable device such as eyeglasses, a user can view virtual data such as graphical user interface menus, navigation information, etc. and/or hear audio data, where the digital information appears to be integrated into and/or overlaying the real-world environment. The user can interact with the AR content via the user device(s) (e.g., via a touch screen of the user device(s)) and/or through hand motions, voice commands, etc. that are detected by sensor(s) of the user device(s).

As mentioned above, current AR controllers include user devices such as smartphones and/or wearable devices such as eyeglasses, gloves, bracelets, etc. However, known AR controllers often interfere with the user's biological senses such as vision and touch. For instance, when a user holds a smart phone or computer tablet in his hands to control the AR content via a touch screen of the user device, the user's hand movements are restricted. In examples in which the AR controller includes eyeglasses or goggles, the user may find it unnatural and/or uncomfortable to repeatedly raise his or her hand to reach for controller buttons on the glasses to interact with the AR content. AR controllers that require the user to wear an apparatus such as a glove to track movement of the user's hand and/or fingers can interfere with natural movements of the user's hand.

Disclosed herein are example AR controllers that are worn about a user's neck and, thus, reduce interference between the user and the controller as the user interacts with AR content by allowing the user's hands, face, etc. to remain unencumbered. Example AR controllers disclosed herein include sensors that detect one or more responses of the user and generate sensor data based on the user response(s). The sensor data is used by the AR controller to allow the user to interact with the AR content. The responses of the user while interacting the with the AR content can include body gestures (e.g., hand gestures) and/or voice commands. In some examples, the responses of the user are biological responses such as muscle activity, changes in body temperature, nervous system activity, etc.

The sensors of example AR controllers disclosed herein can include motion sensors such as infrared sensors to detect movement of the user's hands and/or fingers. The sensors can include image sensors (e.g., cameras) to generate images of the user's hand and/or finger movements. The sensors of example AR controllers disclosed herein can include microphones to detect sound from the user (e.g., voice command(s)). The sensors can include muscle sensors such as electromyography (EMG) sensors for sensing muscle movements and/or nerve sensors such as electroencephalography (EEG) sensors to sense nervous system activity generated at the back of the neck near the cervical region, or the area of the spine associated with nerves responsible for shoulder, wrist, hand, and finger movement.

Example AR controllers disclosed herein analyze the sensor data and output instructions that are transmitted to a user device executing an AR application to allow the user to control the AR content by changing the AR content, manipulating the AR content, making a selection based on the AR content, etc. In some examples, the AR controller generates the instructions based on one type of sensor data, such as audio sensor data. In some other examples, the AR controller uses two or more types of sensor data to generate the instructions. For instance, the AR controller can use image data generated by the cameras to detect and interpret gestures by the user and data from the muscle sensors and/or the nerve sensors to augment or confirm the analysis of the image data.

In some examples disclosed herein, machine learning analysis is used to train the AR controller to recognize user gestures, voice commands, muscle activity, etc. based on the sensor data generated by the various sensors of the AR controller and to provide corresponding outputs to facilitate user interaction with the AR content. For example, the AR controller can be trained to recognize that a first gesture, such as a user raising his or her arm, is associated with volume control of an audio application such as a music player whereas a second motion, such as finger tapping, indicates that the user wishes to pause a navigation application. In some examples, the AR controller is trained using machine learning analysis to generate instructions that result in the same output by the AR application in response to receiving data from different types of sensors. For example, if the user is in a location where privacy is desired, data from the muscle sensor(s) and/or nerve sensor(s) can be used to control the AR content in lieu of image data collected by the cameras of the AR controller based on training data that associates the different sensor data with the same output desired by the user.

Although example controllers disclosed herein are discussed in the context of augmented reality applications, teachings disclosed herein can be used in connection with other digital reality applications, such as virtual reality, mixed reality, etc. As such, the discussion of augmented reality is for illustrative purposes only and does not limit this disclosure to augmented reality applications.

Figure 2:
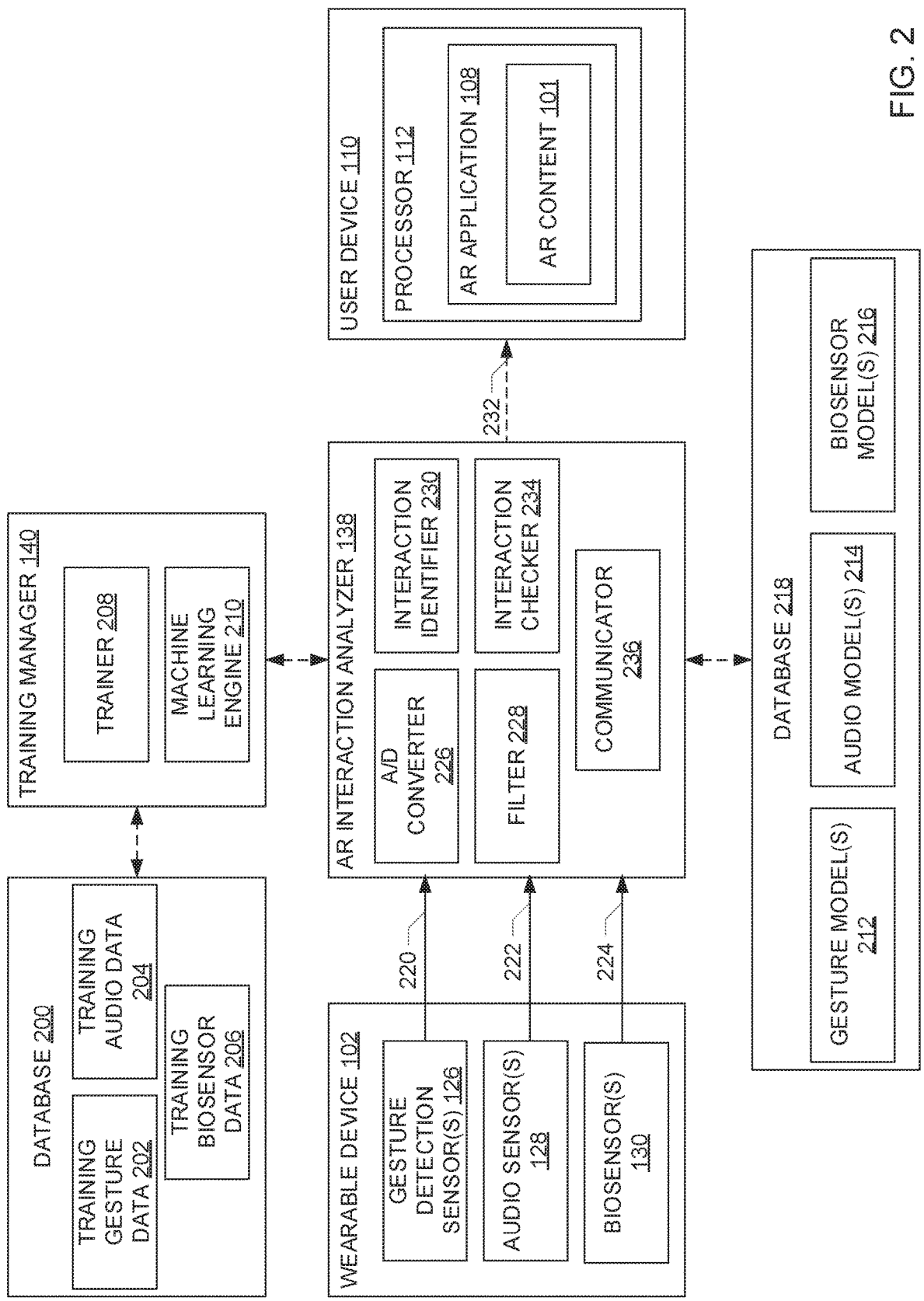
FIG. 2 is a block diagram of an example implementation of the training manager and the augmented reality interaction analyzer of FIG. 1.

FIG. 1 illustrates an example system 100 constructed in accordance with teachings of this disclosure for interacting with augmented reality (AR) content 101 via a wearable AR controller or, more generally referred to herein as a wearable device 102, worn about a neck 104 of a user or subject 106 (the terms "user" and "subject" are used interchangeably herein and both refer to a biological creature such as a human being). The AR content 101 can include digital information, such as visual data and/or audio data. In the example of FIG. 2, the AR content 101 is output for presentation to the user 106 by an AR application 108. The AR application 108 can be executed by a processor 109 of a user device 110 such as a smartphone, a tablet, another wearable device such as goggles, or a virtual assistant device such as Amazon® Alexa® (e.g., which presents audio data). The AR content 101 can be presented, for instance, via a display screen 114 of the user device 110, such that the AR content 101 appears to be integrated in or overlaying the real-world environment via the display screen 114. In some examples, the AR content 101 is presented via speaker(s) 116 of the user device 110. In the example of FIG. 1, the wearable device 102 is in communication with the user device 110 and, thus, the AR application 108, via one or more wired or wireless connections, thereby allowing for user control of the AR content 101 via the wearable device 102.

As illustrated in FIG. 1, the wearable device 102 includes a substantially U-shaped frame 117 to fit around the user's neck 104 while providing for ease in donning and removing the wearable device 102. However, the wearable device 102 can have other shapes, such as a circular shape that is placed over the user's head. The wearable device 102 can be made of one or more materials including, for instance, a lightweight plastic to provide structure to the wearable device 102 without weighing heavily on the user 106 and cushioning material to provide comfort as the wearable device 102 rests on the user's neck, shoulders, and/or chest during use.

The example wearable device 102 of FIG. 1 includes one or more sensors coupled to the wearable device 102. In particular, in the example of FIG. 1, the wearable device 102 includes a plurality of sensors capable of generating different types of sensor data. The sensors of the wearable device 102 can be coupled to different portions of the frame 117 of the wearble device 102, including a front portion 118, a left side portion 120, a right side portion 122, and a rear portion 124. When worn by the user, the front portion 118 of the frame 117 of the wearable device 102 faces away from the user 106, the rear portion 124 is disposed proximate to a back of the user's neck 104, and the left and right side portions 120, 122 are disposed therebetween.

The example wearable device 102 of FIG. 1 includes one or more gesture detection sensors 126. In the example of FIG. 1, the gesture detection sensor(s) 126 are coupled to the front portion 118 of the wearable device 102. The gesture detection sensor(s) 126 can include image sensor(s) (e.g., camera(s)) to generate image data while the user 106 is wearing the wearable device 102. The image sensor(s) capture image data of arm, hand, and/or finger movements performed by the user 106 while interacting with AR content 101. In some examples, the gesture detection sensor(s) 126 include motion sensor(s) (e.g., infrared sensor(s)) to detect user movements. In some examples, the gesture detection sensor(s) 126 include proximity sensor(s) to detect, for instance, the presence of a hand of the user 106 within the range of the proximity sensor(s).

The coupling of the gesture detection sensor(s) 126 (e.g., the image sensors(s), the motion sensor(s), the proximity sensor(s)) to the front portion 118 of the frame 117 of the wearable device 102 enables the gesture detection sensor(s) 126 to detect user movements occurring in the front of the user's body. For instance, in examples in which the gesture detection sensor(s) 126 include cameras, the placement of the camera(s) at the front portion 118 of the wearable device 102 provides the cameras with a field of view that is directed away from the user (e.g., away from the user's neck) and captures the surrounding environment and user movements such as raising an arm, pointing a finger, bending a wrist, etc. Similarly, the placement of the motion sensor(s) and/or the proximity sensors at the front portion 118 of the wearable device 102 enables the motion sensor(s) and/or the proximity sensor(s) to detect user movements relative to the front of the user's body, such as the upper torso.

In the example of FIG. 1, the left and rights side portions 120, 122 of the frame 117 of the wearable device 102 can additionally or alternatively include the gesture detection sensor(s) 126. For example, motion sensor(s) coupled to the left and/or right side portions 120, 122 can detect user movements relative to a head of user 106, such as the user 106 bringing his or her hand to touch his or her ear.

The example wearable device 102 of FIG. 1 includes one or more audio sensors 128. In the example of FIG. 1, the audio sensor(s) 128 are coupled to the left and/or right side portions 120, 122 of the frame 117 of the wearable device 102. The audio sensor(s) 128 can include microphone(s) to generate sound data as the user speaks. The coupling of the audio sensor(s) 128 to the left and/or right side portions 120, 122 of the wearable device 102 proximate to the user's mouth minimizes the detection of interfering sounds from the environment by the audio sensor(s) 128, which could occur if the audio sensor(s) 128 were coupled to, for instance, the rear portion 124 of the wearable device 102. However, the audio sensor(s) 128 can be coupled to any of the front, left side, right side, or rear portions 118, 120, 122, 124 of the wearable device 102.

The example wearable device 102 of FIG. 1 includes one or more biosensors 130. In the example of FIG. 1, the biosensor(s) 130 are coupled to the rear portion 124 of the frame 117 of the wearable device 102. The biosensor(s) 130 can include electromyography (EMG) sensors for sensing muscle movements and/or nerve sensors such as electroencephalography (EEG) sensors to sense nervous system activity. In some examples, the biosensor(s) 130 include near-infrared sensors that penetrate the user's skin to scan the user's body (e.g., at the neck region). In some examples, the biosensor(s) 130 include body temperature sensor(s) to measure a body temperature of the user. In the example of FIG. 1, the coupling of the biosensor(s) 130 to the rear portion 124 of the wearable device 102 allows the biosensor(s) 130 to detect, for instance, nervous system activity occurring at the back of the user's neck 104 near the cervical region, or the area of the spine associated with nerves responsible for shoulder, wrist, hand, and finger movement.

The example wearable device 102 of FIG. 1 can include other types of sensor(s) 126, 128, 130 than shown in FIG. 1. Also, the number and/or location of any of the sensor(s) 126, 128, 130 relative to the front, left side, rear side, and/or rear portions 118, 120, 122, 124 of the wearable device 102 can differ from the example shown in FIG. 1.

The example system 100 of FIG. 1 includes one or more semiconductor based processors to store sensor data generated by the gesture detection sensor(s) 126, the audio senor(s) 128, and/or the biosensor(s) 130. For example, as illustrated in FIG. 1, a processor 132 is coupled (e.g., mounted) to the wearable device 102. The sensor(s) 126, 128, 130 can transmit the sensor data to the on-board processor 132 of the wearable device 102. Also, the wearable device 102 of FIG. 1 includes a battery 134 to provide power to the processor 132 and/or other components of the wearable device 102.

In other examples, the processor 132 is separate from the wearable device 102. For example, the sensor(s) 126, 128, 130 can transmit sensor data to the processor 109 of the user device 110. In other examples, the sensor(s) 126, 128, 130 can transmit the sensor data to a cloud-based device 136 (e.g., one or more server(s), processor(s), and/or virtual machine(s)).

In some examples, the processor 132 of the wearable device 102 is communicatively coupled to one or more other processors. In such example, the sensor(s) 126, 128, 130 can transmit the sensor data to the on-board processor 132 of the wearable device. The on-board processor 132 of the wearable device 102 can then transmit the sensor data to the processor 109 of the user device 110 and/or the cloud-based device 136. In some such examples, the wearable device 102 (e.g., the sensor(s) 126, 128, 130 and/or the on-board processor 132) and the processor(s) 109, 136 are communicatively coupled via one or more wired connections (e.g., a cable) or wireless connections (e.g., cellular, Wi-Fi, or Bluetooth connections).

In the example system 100 of FIG. 1, the sensor data generated by the gesture detection sensor(s) 126, the audio senor(s) 128, and/or the biosensor(s) 130 is processed by an AR interaction analyzer 138. The example AR interaction analyzer 138 can be implemented by software executed on the processor 132 of the wearable device 102, the processor 109 of the wearable or non-wearable user device 110, and/or the cloud-based device 136. In some examples, one or more components of the example AR interaction analyzer 138 are implemented by the on-board processor 132 of the wearable device 102 and one or more other components are implemented by the processor 132 of the user device 110 and/or the cloud-based device 136. The dotted lines extending from the AR interaction analyzer 138 in FIG. 1 demarcate the different locations for the AR interaction analyzer 138 (e.g., on the wearable device 102, in the cloud 136, and/or in a wearable or non-wearable user device 110).

In the example system 100 of FIG. 1, the AR interaction analyzer 138 serves to process the sensor data generated by the respective sensor(s) 126, 128, 130 to identify user interactions with the AR content 101. In the example system 100 of FIG. 1, the gesture detection sensor(s) 126, the audio sensor(s) 128, and/or the biosensor(s) 130 generate sensor data while the user 106 is wearing the wearable device 102 and the wearable device 102 is in an active or powered-on state. In some examples, the sensor(s) 126, 128, 130 generate the sensor data based on communication between the processor 132 of the wearable device and the processor 109 of the user device indicating that the AR content 101 is being presented to the user 106 via the AR application 108. The AR interaction analyzer 138 receives and processes the sensor data generated by the sensor(s) 126, 128, 130.

In some examples, the AR interaction analyzer 138 receives the sensor data in substantially real-time (e.g., near the time the data is collected). In other examples, the AR interaction analyzer 138 receives the sensor data at a later time (e.g., periodically and/or aperiodically based on one or more settings but sometime after the activity that caused the sensor data to be generated, such as a hand motion, has occurred (e.g., seconds, minutes, hours, days, etc. later). The AR interaction analyzer 138 can perform one or more operations on the sensor data such as filtering the raw signal data, removing noise from the signal data, converting the signal data from analog data to digital data, and/or analyzing the data. For example, the AR interaction analyzer 138 can convert the sensor data from analog to digital data at the on-board processor 132 and the digital data can be analyzed by on-board processor 132 and/or by one or more off-board processors, such as the processor 109 of the user device 110 and/or the cloud-based device 136.

The example AR interaction analyzer 138 analyzes the sensor data generated by one or more of the gesture detection sensor(s) 126, the audio sensor(s) 128, and/or the biosensor(s) 130 to determine the user interaction with the AR content 101. For example, the AR interaction analyzer 138 analyzes image data generated by the gesture detection sensor(s) 126 and identifies the gesture(s) being performed by the user 106. Based on the identification of the gesture(s), the AR interaction analyzer 138 determines a command corresponding to the gesture(s) that is to be executed by the AR application to effect the interaction between the user 106 and the AR content 101. In some examples, the AR interaction analyzer 138 analyzes sensor data from a first type of sensor (e.g., the gesture detection sensor(s) 126) and uses sensor data from a second type of sensor (e.g., the biosensor(s) 130) to confirm, amplify, and/or augment the analysis of the sensor data received from the first type of sensor. For instance, muscle movement data detected by the biosensor(s) 130 can be used to confirm image data and/or motion data generated by gesture detection sensor(s) 126 indicating that the user 106 has performed a particular finger movement.

In the example of FIG. 1, the AR interaction analyzer 138 determines the user interaction(s) with the AR content 101 from the sensor data generated by the sensor(s) 126, 128, 130 based on machine learning algorithm(s). The example AR interaction analyzer 138 is trained by a training manager 140 using machine learning technique(s) (e.g., supervised learning) and based on training dataset(s) generated from sensor data collected from the user 106 and/or one or more different users. The example training manager 140 can be implemented by the processor 132 of the wearable device 102. In some examples, the training manager 140 is implemented by the processor 109 of the user device 110. In other examples, the training manager 140 is implemented by the cloud-based device 136. In other examples, some of the analysis performed by the training manager 140 is implemented by cloud-based device(s) (e.g., the cloud-based device 136) and other parts of the analysis are implemented by processor(s) or one or more user device(s) (e.g., the processor 109 of the user device 110). The processor(s) and/or cloud-based device(s) that are used to implement the training manager 140 can be the same or different as the processor(s) and/or cloud-based device(s) used to implement the AR interaction analyzer 212

The training manager 140 trains the AR interaction analyzer 138 to recognize gestures performed by the user 106 and to associate the gestures with different commands to be output by the AR application 108 with respect to the AR content 101. For example, the training manager 140 uses previously generated image data feeds showing a user raising his hand to his ear to teach the AR interaction analyzer 138 that such a gesture indicates that the user wishes to change a song being played by a music application. As such, when the image data collected by the gesture detection sensor(s) 126 during operation of the wearable device 102 indicates that the user 106 has raised his hand to his or her ear, the AR interaction analyzer 138 associates the gesture with a command for the AR application to change the song being played.

The AR interaction analyzer 138 generates one or more outputs based on the analysis of the sensor data. In the example of FIG. 1, the outputs include instructions for the AR application to execute certain commands to respond to and/or implement the user's intended interactions with the AR content 101 (e.g., making a selection based on the content, changing the content displayed, etc.). The instructions are transmitted to the user device 110 and executed by the AR application 108 to implement the user's commands with respect to the AR content 101.

FIG. 2 is a block is a block diagram of an example implementation of the example AR interaction analyzer 138 of FIG. 1. As mentioned above, the example AR interaction analyzer 138 is constructed to identify interactions of a user (e.g., the user 106 of FIG. 1) with AR content (e.g., the AR content 101 of FIG. 1) and to generate instructions that cause the AR content to respond to the user interactions. In the example of FIG. 2, the AR interaction analyzer 138 is implemented by one or more of the processor 132 of the wearable device 102 of FIG. 1, the processor 109 of the user device 110, and/or cloud-based devices 136 (e.g., the server(s), processor(s), and/or virtual machine(s) 136 of FIG. 1). In some examples, some of the user interaction analysis is implemented by the AR interaction analyzer 138 via a cloud-computing environment and one or more other parts of the analysis is implemented by the processor 132 of the wearable device 102 and/or the processor 109 of the user device 110.

In some examples, the location(s) at which the analysis is performed by the AR interaction analyzer 138 is based on whether the analysis is to be performed in substantially real-time as the sensor data (e.g., the sensor data generated by the gesture detection sensor(s) 126, the audio sensor(s) 128, and/or the biosensor(s) 130) is being generated or whether the analysis is to be performed at a later time. For example, if the analysis is to be performed in substantially real-time as the sensor data is being generated, the analysis may be performed at the processor 132 of the wearable device 102. In other examples, if the analysis is to be performed at a later time and/or if the sensor data is to be transferred to the AR interaction analyzer 138 at a later time, then the analysis may be performed at the processor 109 of the user device 110.

In some other examples, analysis of the sensor data generated by the different sensors 126, 128, 130 may be performed at different locations based on, for instance, processing resources. For instance, motion data generated by the gesture detection sensor(s) 126 can be analyzed at the on-board processor 132 of the wearable device 102 and data generated by the biosensor(s) 130 can be analyzed by the processor 109 of the user device 110 and/or the cloud-based device 136, as analyzing data generated by the biosensor(s) 130 may require more processing resources than analyzing the motion data.

As mentioned above, the AR interaction analyzer 138 is trained to recognize user interactions by the training manager 140 of FIG. 1 using machine learning and training sensor data for one or more subjects, which may or may not include sensor data collected from the user 106 of FIG. 1. In some examples, the training sensor data is generated from subject(s) wearing the example wearable device 102 of FIG. 1. In some other examples, the training sensor data is generated from subject(s) wearing another wearable device including one or more sensors, such as motion sensors, biosensors, etc. In some other examples, the training sensor data is generated from subject(s) in which the sensors are attached to the subject, as in the case of, for instance, EMG or EEG sensors. The training sensor data is stored in a database 200. In some examples, the training manager 140 includes the database 200. In other examples, the database 200 is located external to the training manager 140 in a location accessible to the training manager 140 as shown in FIG. 2.

In the example of FIG. 2, the training sensor data includes training gesture data 202, or data including a plurality of gestures performed by user(s) and associated user interactions represented by the gestures in the context of controlling the AR content 101. For instance, the training gesture data 202 can include a first rule indicating that a gesture in which a user touches his or her ear indicates that the volume of audio data should be raised and a second rule indicating that a gesture in which the user touches his or her wrist indicates that the user wishes to select a user menu displayed via the AR content.

In the example of FIG. 2, the training sensor data includes training audio data 204. The training audio data 204 includes words and/or phrases and associated meanings of the words and/or phrases in the context of controlling the AR content 101. For instance, the training audio data 204 can includes rules associating the word "next" with a request to view different AR content.

Also, in the example of FIG. 2, the training sensor data includes training biosensor data 206. The training biosensor data 206 can include, for instance, baseline signal data (e.g., average baseline signal data) generated from EMG sensor(s) as the subject(s) performs particular muscle movements such as raising an arm, making a first, etc. Similarly, the training biosensor data 206 can include baseline signal data generated from EEG sensors as the subject(s) perform different movements. The training biosensor data 206 can include information about characteristics of the signal data generated from the biosensors during different movements, such as peak amplitude, frequency, etc. For example, the training biosensor data 206 can include distinguish features between biological signal data, such as average amplitude associated with finger muscle movements versus average amplitude associated with shoulder muscle movements.

The example training manager 140 of FIG. 2 includes a trainer 208 and a machine learning engine 210. The trainer 208 trains the machine learning engine 210 using the training gesture data 202, the training audio data 204, and the training biosensor data 206 (e.g., using supervised learning) to generate one or more models that are used by the AR interaction analyzer 138 to determine outputs to be provide to the AR application 108 with respect to user interactions with the AR content 101. For example, the trainer 208 uses the training gesture data 202 to generate one or more gesture models 212 via the machine learning engine 210 that define the output(s) to be provided by the AR application 108 in response to particular gestures performed by the user 106 wearing the wearable device 102. As another example, the trainer 208 uses the training audio data 204 to generate one or more audio models 214 via the machine learning engine 210 that define the output(s) to be provided by the AR application 108 in response to particular verbal commands spoken by the user 106 wearing the wearable device 102. The trainer 208 uses the training biosensor data 206 to generate one or more biosensor models 216 via the machine learning engine 210 that define the output(s) to be provided by the AR application 108 in response to, for instance, features of particular signal data generated during user movements, such as amplitude data, frequency data, etc. The biosensor model(s) 216 can include, for instance, amplitude thresholds for associating EMG data with different muscle movements (e.g., arm versus finger movements).

In the example of FIG. 2, the gesture model(s) 212, the audio model(s) 214, and the biosensor model(s) 216 generated during training are stored in a database 218. In some examples, the AR interaction analyzer 138 includes the database 218. In other examples, the database 218 is located external to the AR interaction analyzer 138 in a location accessible to the AR interaction analyzer 138. The databases 200, 218 of FIG. 2 may be the same storage device or different storage devices.

The example database 218 can store additional or fewer models than shown in FIG. 2. For example, the database 218 can store a model generated during training based on two or more types of training data, such as the training gesture data 202 and the training audio data 204. Such model(s) can define a certain output to be provide by the AR application 108 based on a combination of, for instance, a gesture and a voice command. As another example, if the AR application 108 does not accommodate audio data (e.g., voice commands), the wearable device 102 may not include the audio sensor(s) 128 and the AR interaction analyzer 138 may not be trained with respect to analyzing audio data. In such examples, the audio model(s) 214 may not be generated or provided to the AR interaction analyzer 138.

In the example of FIG. 2, the AR interaction analyzer 138 uses the model(s) 212, 214, 216 to interpret the respective sensor data generated by the gesture detection sensor(s) 126, the audio sensor(s) 128, and/or the biosensor(s) 130 while the user 106 is wearing the wearable device 102 and to determine the instructions to be provided to the AR application 108 to provide for the desired user interaction with the AR content 101. In some examples, the AR interaction analyzer 138 receives gesture sensor data 220 generated by the gesture detection sensor(s) 126 (e.g., the camera(s), the motion sensor(s)). The gesture sensor data 220 can include image data, motion detection data, etc. In some examples, the AR interaction analyzer 138 receives audio sensor data 222 generated by the audio sensor(s) 128. In some examples, the AR interaction analyzer 138 receives biosensor data 224 from the biosensor(s) 130. The biosensor data 224 can include EMG data, EEG data, body scan imaging data, etc.

The gesture sensor data 220, the audio sensor data 222, and/or the biosensor data 224 can be stored in the database 218.

The example AR interaction analyzer 138 of FIG. 2 includes an analog-to-digital (A/D) converter 226. In the illustrated example, the A/D converter 226 provides means for sampling the raw analog gesture sensor data 220, the raw analog audio sensor data 222, and/or the raw biosensor data 224 at a particular sampling rate and converting the analog data to digital signal data for analysis by the example AR interaction analyzer 138.

The example AR interaction analyzer 138 of FIG. 2 includes a filter 228 (e.g., a band pass filter). In some examples, the biosensor data 224 includes noise and/or data in frequency bands that are not of interest based on, for instance, a particular user movement such as a finger movement. The filter 228 filters the biosensor data 224 to pass frequencies within a known frequency band associated with movements by particular body parts, such as finger movements, hand movements, arm movements, etc. As another example, the audio sensor(s) 128 may detect noise in the environment in which the user 106 is located in while wearing the wearable device 102. In such examples, the filter 228 can filter the audio sensor data 222 to remove the noise.

The example AR interaction analyzer 138 of FIG. 2 includes an interaction identifier 230. The interaction identifier 230 analyzes the gesture sensor data 220 to identify the user gesture(s) represented in the gesture sensor data 220. The interaction identifier 230 uses the gesture model(s) 212 to determine the user interaction with the AR content 101 based on the particular gesture(s). The interaction identifier 230 analyzes the audio sensor data 222 to identify the audio (e.g., voice commands, sounds, etc.) represented in the audio sensor data 222. The interaction identifier 230 uses the audio model(s) 214 to identify the user interaction with the AR content 101 based on the particular audio. The interaction identifier 230 analyzes the biosensor data 224 and uses the biosensor model(s) 216 to identify the user interaction with the AR content 101 based on, for instance, characteristics of the signal data such as amplitude represented in the biosensor data 224.

Based on the analysis of the gesture sensor data 220, the audio sensor data 222, and/or the biosensor data 224, the interaction identifier 230 determines the output(s) to be provided by the AR application 108 to cause the AR content 101 to respond based on the user's intended interactions as represented the user's gestures, verbal commands, and/or biological activity. The example interaction identifier 230 implements the model(s) 212, 214, 216 generated based on the training by the trainer 208 to identify the appropriate output(s) 214 by the AR application 108. The interaction identifier 230 generates instruction(s) 232 that are transmitted to the AR application 108 to direct or activate the AR application 108 to generate the output(s) with respect to the AR content 101 based on the user interaction(s).

In some examples, the interaction identifier 230 determines the output(s) to be provided by the AR application 108 based one data feed, such as the gesture sensor data 220, the audio sensor data 222, or the biosensor data 224. In some other examples, the interaction identifier 230 determines the output(s) to be provided by the AR application based on two or more of the sensor data feeds 220, 222, 224. In some examples, the sensor data 220, 222, 224 transmitted to the AR interaction analyzer 138 and/or analyzed by the interaction identifier 230 is based on user settings. For instance, if the user 106 is in a public space and does not want to provide audio commands, the user can instruct the wearable device 102 not to generate the audio sensor data 222 via the audio sensor(s) 128. In some other such examples, the user can instruct the AR interaction analyzer 138 not to analyze the audio sensor data 222. The user settings with respect to the sensor data 220, 222, 224 that is used to interact with the AR content 101 can be provided by the user via, for instance, the user device 110, the wearable device 102 (e.g., sensor activation button(s)), etc.

The example AR interaction analyzer 138 includes an interaction checker 234. In examples in which the interaction identifier 230 analyzes the sensor data 220, 222, 224 from the different types of sensors 126, 128, 130 (e.g., sensor data 220, 222, 224 generated in temporal proximity), the interaction checker 234 verifies and/or adjusts the analysis of the sensor data 220, 222, 224 by the interaction identifier 230 to confirm that the instruction(s) 232 generated by the interaction identifier 230 accurately reflect the user's intended interaction with the AR content 101.

As an example, the AR interaction analyzer 138 can receive the gesture sensor data 220 including image data and the biosensor data 224 from the wearable device 102. The biosensor data 224 can include EEG or nervous system data collected from the back of the user's neck 104. Based on the gesture sensor data 220 (e.g., the image data) and the gesture model(s) 212, the interaction identifier 230 can determine that the user 106 performed a fingertip gesture. The interaction checker 234 of the example AR interaction analyzer 138 verifies the determination by the interaction identifier 230 that the user performed a fingertip gesture based on the biosensor data 224, which can include nervous system data generated at a portion of the user's spine where nerves extending to the user's fingers are controlled. For instance, the interaction checker 234 can compare the output(s) the biosensor model(s) 216 based on the biosensor data 224 to the output(s) of the gesture model(s) 212 to confirm that the user did perform a fingertip gesture.

In some other examples, the gesture sensor data 220 includes data generated by an infrared motion sensor detecting motion in the range of the sensor (e.g., an area in front of the user's chest). In such examples, the interaction checker 234 instructs the interaction identifier 230 to use the biosensor data 224 including the nervous system data to augment the gesture sensor data 220 to determine that the user performed a fingertip gesture (e.g., biosensor data 224 generated in temporal proximity to the gesture sensor data 220). Thus, in some examples, the biosensor data 224 can be used to amplify, augment, and/or confirm the analysis of the gesture sensor data 220.

The AR interaction analyzer 138 of the example of FIG. 2 includes a communicator 236 to transmit the instruction(s) 232 to the interactive AR application 108. In some examples, the communicator 236 interfaces and/or communicates with graphic engines, audio output generators, etc. associated with the AR application 108 and/or the user device 110 to activate the AR application 108 and/or the user device 110 to implement the user interaction(s) with the AR content 101.

In some examples, the communicator 236 also transmits the gesture sensor data 220, the audio sensor data 222, the biosensor data 224, and/or the instruction(s) 232 generated based on the sensor data 220, 222, 224 to the trainer 208 of the example training manager 140. The trainer 208 can use the sensor data 220, 222, 224 and/or the instruction(s) 232 to train the machine learning engine 210 to refine the model(s) 212, 214, 216 based on sensor data generated for the user 106. Thus, in some examples, the model(s) 212, 214, 216 are tuned, refined, or user-customized based on the sensor data 220, 222, 224 generated while the user 106 is wearing the wearable device 102. In some examples, the interaction identifier 230 relies on fewer types of sensor data generated by the different types of the sensors 126, 128, 130 as the model(s) 212, 214, 216 are tuned. For instance, as the biosensor model(s) 216 are tuned based on the biosensor data 224, the interaction identifier 230 may not use the gesture sensor data 220 to distinguish between hand gestures and arm movements by the user 106. As another example, as the gesture model(s) 212 are tuned based on the gesture sensor data 220, the interaction identifier 230 may not use the audio sensor data to determine the user's desired interactions with the AR content 101.

While an example manner of implementing the example training manager 140 of FIG. 1 is illustrated in FIG. 2, one or more of the elements, processes and/or devices illustrated in FIG. 2 may be combined, divided, re-arranged, omitted, eliminated and/or implemented in any other way. Further, the example database 200, the example trainer 208, the example machine learning engine 210 and/or, more generally, the example training manager 140 of FIG. 2 may be implemented by hardware, software, firmware and/or any combination of hardware, software and/or firmware. Thus, for example, any of the example database 200, the example trainer 208, the example machine learning engine 210 and/or, more generally, the example training manager 140 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example database 200, the example trainer 208, and/or the example machine learning engine 210 is/are hereby expressly defined to include a non-transitory computer readable storage device or storage disk such as a memory, a digital versatile disk (DVD), a compact disk (CD), a Blu-ray disk, etc. including the software and/or firmware. Further still, the example training manager of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

While an example manner of implementing the example AR interaction analyzer 138 of FIG. 1 is illustrated in FIG. 2, one or more of the elements, processes and/or devices illustrated in FIG. 2 may be combined, divided, re-arranged, omitted, eliminated and/or implemented in any other way. Further, the example database 218, the example A/D converter 226, the example filter 228, the example interaction identifier 230, the example interaction checker 234, the example communicator 236, and/or, more generally, the example AR interaction analyzer 138 of FIG. 2 may be implemented by hardware, software, firmware and/or any combination of hardware, software and/or firmware. Thus, for example, any of the example database 218, the example A/D converter 226, the example filter 228, the example interaction identifier 230, the example interaction checker 234, the example communicator 236, and/or, more generally, the example AR interaction analyzer 138 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example database 218, the example A/D converter 226, the example filter 228, the example interaction identifier 230, the example interaction checker 234, and/or the example communicator 236 is/are hereby expressly defined to include a non-transitory computer readable storage device or storage disk such as a memory, a digital versatile disk (DVD), a compact disk (CD), a Blu-ray disk, etc. including the software and/or firmware. Further still, the example AR interaction analyzer of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
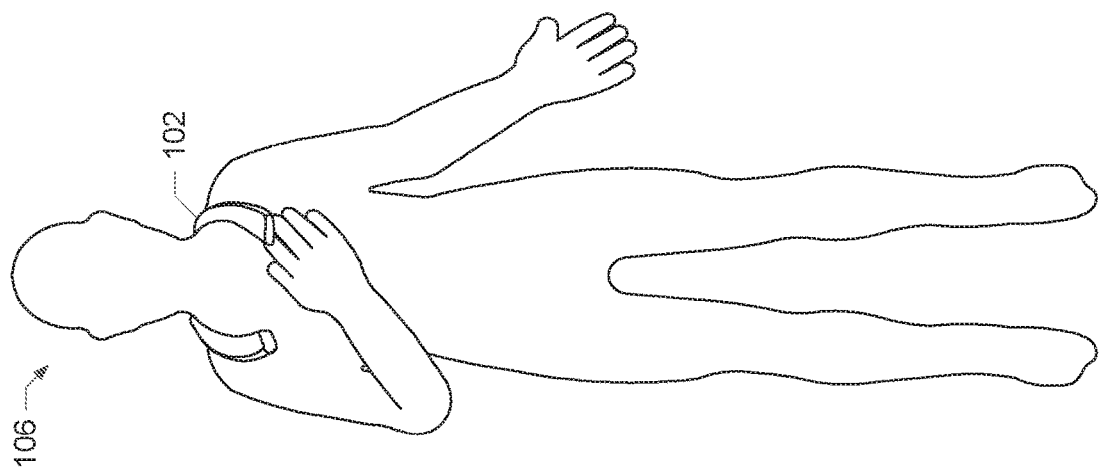
FIGS. 3-5 illustrate example gestures performed by a user 106 while wearing the augmented reality controller FIG. 1 and analyzed by the example augmented reality interaction analyzer of FIGS. 1 and 2 to enable the user to interact with augmented reality content in accordance with teachings of this disclosure.
Figure 4:
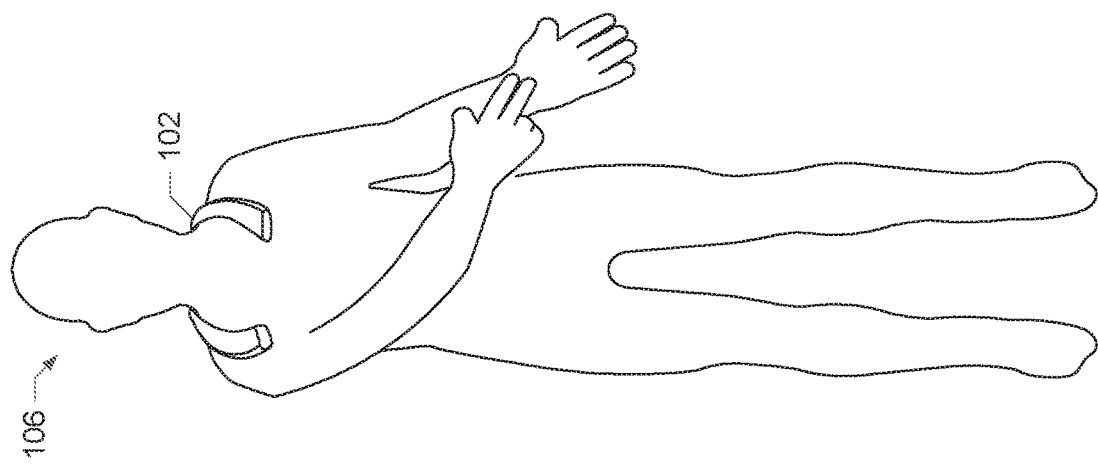
Figure 5:
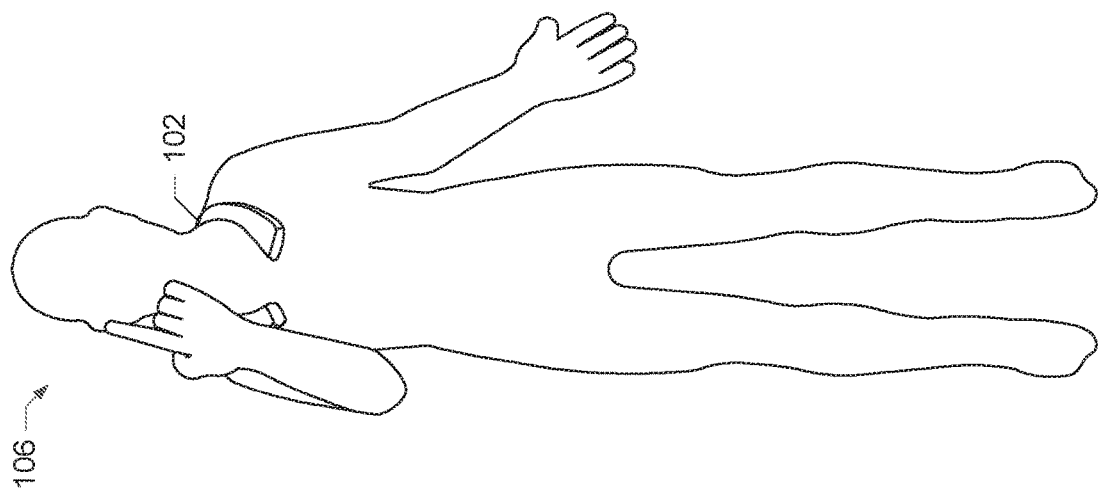

FIGS. 3-5 illustrate example gestures performed by the user 106 while wearing the example wearable device 102 of FIGS. 1 and 2 and interpreted by the example AR interaction analyzer 138 of FIGS. 1 and 2 to enable the user 106 to interact with AR content (e.g., the AR content 101 of FIGS. 1 and 2). As shown in FIGS. 3-5, the user gestures can include touching one of the user's ears with one of his or her fingers (FIG. 3), touching an inside of the user's wrist with two fingers of his or her opposite hand (FIG. 4), and/or placing his or her hand over his or heart with the palm open and the fingers together (FIG. 5). As disclosed above, the example AR interaction analyzer 138 of FIGS. 1 and 2 can determine the user's intended interactions with the AR content corresponding to the different gestures shown in FIGS. 3-5 based on the machine learning models 212, 214, 216 and the sensor data generated by the sensors (e.g., the sensors 126, 128, 130 of FIGS. 1 and 2) of the wearable device 102, including the gesture sensor data 220 and/or the biosensor data 224 (and, in some examples, the audio data 222). The user gestures can be performed to, for instance, make a selection on a menu presented via the AR content, change the AR content being displayed, change a zoom level of the AR content being displayed, change a song being played, etc. Although FIGS. 3-5 illustrate hand and arm gestures, other types of gestures, such as fingertip gestures (e.g., rubbing two fingertips together) can be detected by the sensors of the wearable device 102 and interpreted by the AR interaction analyzer 138 of FIGS. 1 and 2.

In some examples, the user gestures can be performed by the user 106 to control operation of the wearable device 102, such as causing the wearable device 102 to move from a low-power state to a high-power or ready state for detecting user inputs by, for instance, the user raising his or hand to his or her waist. In such examples, the gesture detection sensor(s) 126 can detect motion, which can trigger activation of the wearable device 102 (e.g., via analysis of the motion data locally by the processor 132 of the wearable device 102). In some such examples, the wearable device 102 can provide the user with haptic feedback or audio feedback to inform the user that the sensors of the wearable device 102 are ready to detect user inputs.

Figure 6:
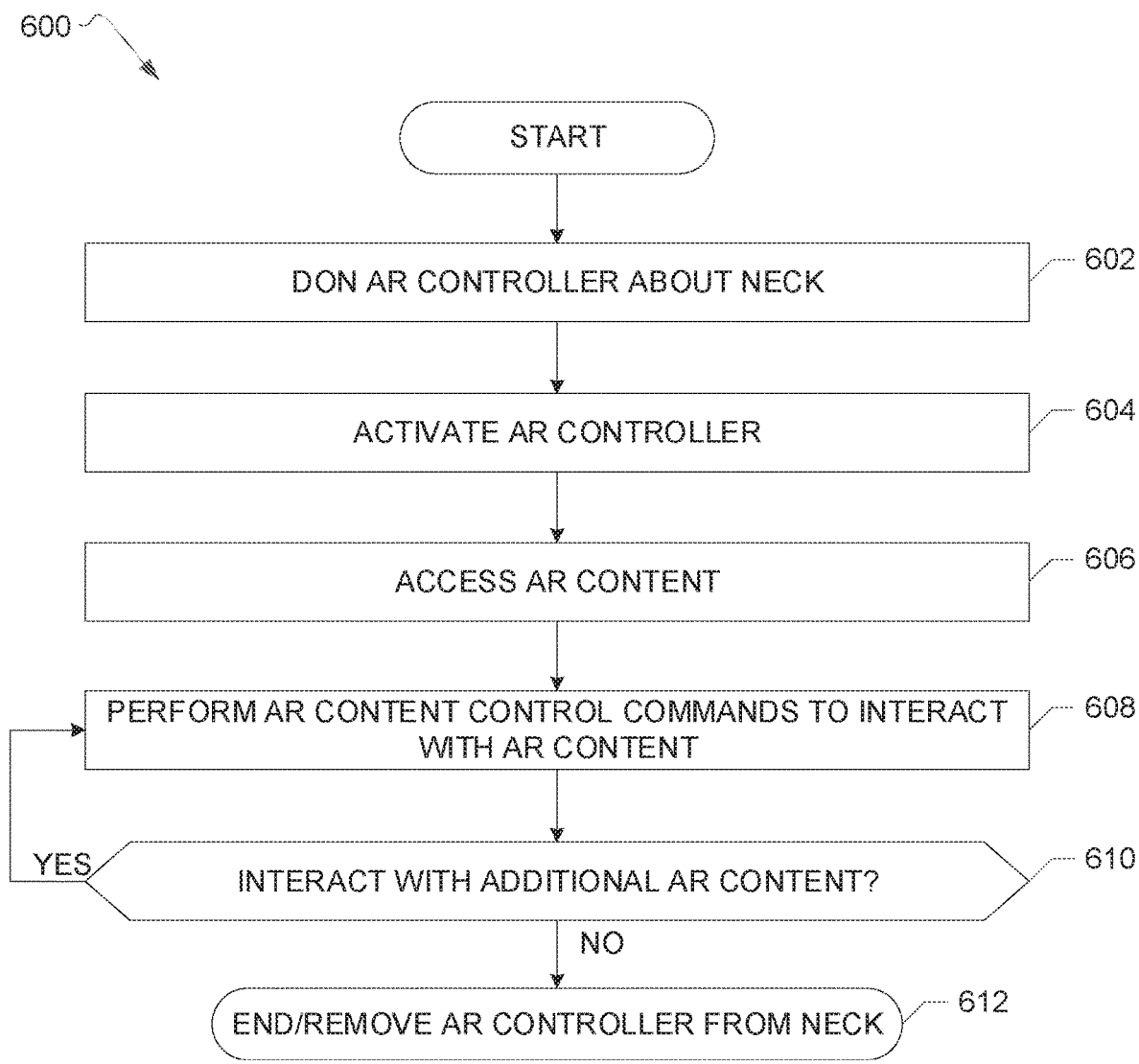
FIG. 6 is a flowchart of an example method of use of the example augmented reality controller of FIG. 1 to interact with augmented reality content in accordance with teachings of this disclosure.

FIG. 6 is a flowchart of an example method of use of the example wearable device or neck-worn, AR controller 102 of FIGS. 1-5 to control AR content (e.g., the AR content 101 of FIGS. 1 and 2). In the example method 600 of FIG. 6, a user dons the wearable device 102 about his or her neck (e.g., the neck 104 of the user 106 of FIG. 1), thereby leaving his or her hands unencumbered (block 602).

In the example of FIG. 6, the user activates the AR controller 102 (block 604). In some examples, the user activates the wearable device 102 by, for instance, selecting a power button and/or instructing the wearable device 102 to move from a low-power state to a high-power or ready state via gesture such as raising his or her hand to a particular position (e.g., to the user's waist or upper torso).

In the example of FIG. 6, the user accesses AR content (block 606). The AR content can be accessed via, for example, the AR application 108 implemented by the user device 110 of FIGS. 1 and 2.

In the example of FIG. 6, the user performs AR content control commands to interact with the AR content (block 608). For example, the user performs arm, hand, and/or finger movement(s) or gesture(s) to control the AR content (e.g., change the AR content, make a selection via the AR content, etc.) while wearing the wearable device 102. In some examples, the AR content control commands include verbal commands spoken by the user.

The example method of FIG. 6 continues until the user no longer wishes to interact with the AR content (block 610). At some point in time after the user no longer wishes to interact the AR content, the user may remove the AR controller from his or her neck (block 612).

Although the example method 600 is described with reference to the flowchart illustrated in FIG. 6, many other methods of using the example wearable AR controller 102 of FIGS. 1-5 may alternatively be used. For example, the order of execution of the blocks may be changed, and/or some of the blocks described may be changed, eliminated, or combined. Similarly, additional operations may be included before, in between, or after the blocks shown in FIG. 6.

Figure 7:
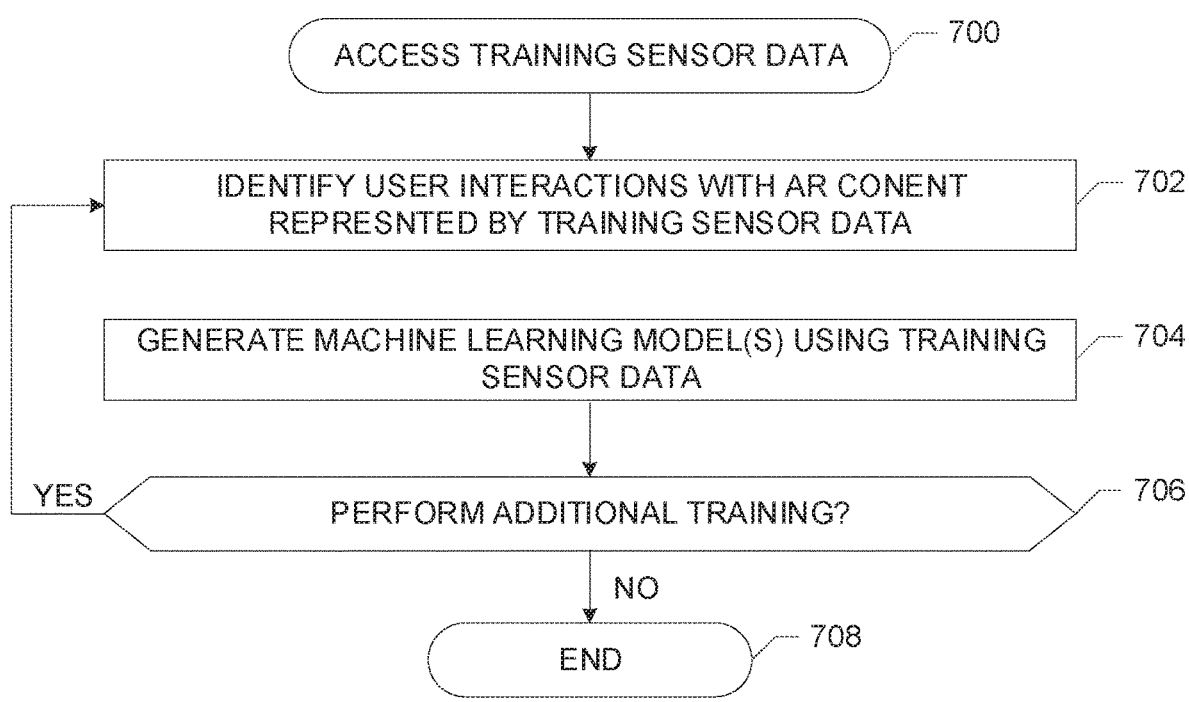
FIG. 7 is a flowchart representative of example machine readable instructions which may be executed to implement the example training manager of FIG. 2.
Figure 8:
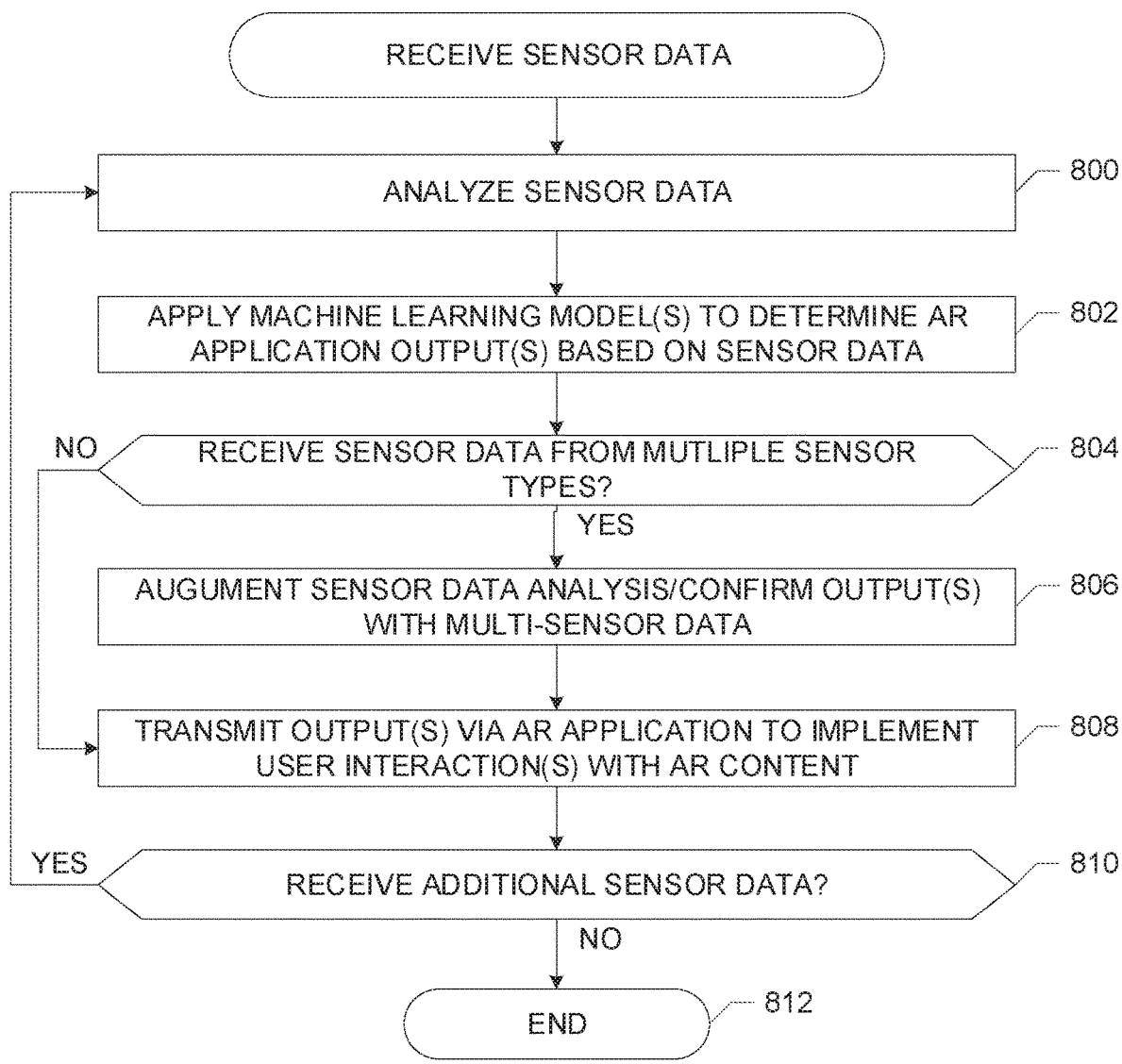
FIG. 8 is a flowchart representative of example machine readable instructions which may be executed to implement the example augmented reality interaction analyzer of FIG. 2.

Flowcharts representative of example hardware logic, machine readable instructions, hardware implemented state machines, and/or any combination thereof for implementing the training manager 140 and/or the example AR interaction analyzer 138 are shown in FIGS. 7 and 8. The machine readable instructions may be an executable program or portion of an executable program for execution by a computer processor such as the processor(s) 138, 140 shown in the example processor platform(s) 900, 1000 discussed below in connection with FIGS. 9 and 10. The program may be embodied in software stored on a non-transitory computer readable storage medium such as a CD-ROM, a floppy disk, a hard drive, a DVD, a Blu-ray disk, or a memory associated with the processor(s) 138, 140, but the entire program and/or parts thereof could alternatively be executed by a device other than the processor(s) 138, 140 and/or embodied in firmware or dedicated hardware. Further, although the example program(s) are described with reference to the flowcharts illustrated in FIGS. 7 and 8, many other methods of implementing the example training manager 140 and/or the example AR interaction analyzer 138 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 7 and 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

FIG. 7 is a flowchart of example machine readable instructions that, when executed, implement the example training manager 140 of FIGS. 1 and/or 2. In the example of FIG. 7, the training manager 140 trains the example AR interaction analyzer 138 of FIGS. 1 and/or 2 using training sensor data, which is generated for one or more users who may or may not be wearing the example wearable AR controller 102 of FIGS. 1-5. As discussed herein, the training manager 140 generates machine learning models that are used by the AR interaction analyzer 138 of FIGS. 1 and/or 2 to determine response outputs by the AR application 108 with respect to the AR content 101 based on user interactions detected by the sensors of the wearable device 102.

The example instructions of FIG. 7 can be executed by one or more processors of, for instance, the wearable device 102, a user device (e.g., the user device 110) and/or a cloud-based device. The instructions of FIG. 7 can be executed in substantially real-time as the training sensor data received by the training manager 140 or at some time after the training sensor data is received by the training manager 140. The training manager 140 can communicate with the AR interaction analyzer 138 via the communicator 236 and one or more wired or wireless communication protocols.

The example trainer 208 of FIG. 2 accesses training gesture data 202, training audio data 204, and/or training biosensor data 206 (block 700). The training sensor data 202, 204, 206 can be stored in the database 200. In some examples, the training sensor data 202, 204, 206 is generated for user(s) who are not wearing the wearing the wearable device 102 (e.g., the training biosensor data 206 can be based on clinical data). In some examples, the training sensor data 202, 204, 206 is generated while user(s) are wearing the wearable device 102. In some such examples, the training sensor data 202, 204, 206 can be received from the AR interaction analyzer 138 and/or directly from the sensors 128, 126, 130 of the wearable device 102.

The example trainer 208 of FIG. 2 identifies the user interactions with the AR content 101 represented by the sensor data (block 702). For example, based on the training gesture data 202, the trainer 208 identifies that a hand motion in which the user touches his or her hand to his or her opposite wrist indicates that the user wishes to scroll through the AR content 101. As another example, based on the training audio data 204, the trainer 208 identifies certain voice commands as associated with certain outputs by the AR application 108, such as the word "pause" to pause animated AR content being displayed via the user device 110. As another example, the trainer 208 identifies certain features of biological data (e.g., muscle activity signal data, nervous system activity signal data, body image scan data) associated with different user gestures based on the training biosensor data 206.

The example trainer 208 of FIG. 2 generates one more machine learning model(s) 212, 214, 216 via the machine learning engine 210 and based on the training sensor data 202, 204, 206 defining intended user interactions with the AR content 101 (block 704). For example, the trainer 208 uses the training gesture data 202 to generate the gesture model(s) 212 that are used by the AR interaction analyzer 138 to determine the outputs to be provided by the AR application 108 in response to certain user gestures. The trainer 208 uses training audio data 204 to generate the audio model(s) 214 that are used by the AR interaction analyzer 138 to determine the outputs to be provided by the AR application 108 in response to certain user verbal commands. The trainer 208 uses the training biosensor data 206 to generate the biosensor model(s) 216 that associate certain features of biological signal data (e.g., amplitude, frequency) with certain user movements and AR content interactions.

The example trainer 208 can continue train the AR interaction analyzer 138 using different datasets and/or datasets having different levels of specificity (block 706). For example, the trainer 208 can generate machine learning model(s) for use by the AR interaction analyzer 138 using a first training biosensor dataset 206 including average EMG amplitude data for a muscle arm movement determined for a plurality of subjects and a second training biosensor dataset 206 including EMG amplitude data for the muscle arm movement generated while the user 106 is wearing the wearable device 102 and interacting with the AR content 101. Thus, the trainer 208 provides the AR interaction analyzer 138 with machine learning model(s) that the AR interaction analyzer 138 can use to recognize certain user activity as indicative of certain user interactions with the AR content 101. The example instructions end when there is no additional training to be performed (e.g., based on user input(s)) (block 708).

FIG. 8 is a flowchart of example machine readable instructions that, when executed by a processor, implement the example AR interaction analyzer 138 of FIGS. 1 and/or 2. In the example of FIG. 8, the AR interaction analyzer 138 generates instruction(s) to be executed by an AR application (e.g., the interactive AR application 108) to control AR content in response to user input(s) detected by the sensors 126, 128, 130 of the wearable device 102.

The example instructions of FIG. 8 can be executed by one or more processors of, for instance, the wearable device 102, a user device (e.g., the user device 110) and/or a cloud-based device. The instructions of FIG. 8 can be executed in substantially real-time as a user interacts with the AR application 108 while wearing the wearable device 102.

The interaction identifier 230 of the example AR interaction analyzer 138 of FIG. 2 analyzes the gesture sensor data 220, the audio sensor data 222, and/or the biosensor data 224 (block 800). For instance, the interaction identifier 230 analyzes the gesture sensor data 220 to identify the user gesture(s) represented in the data (e.g., captured in the camera image data, detected by the motion sensor(s), etc.).

The interaction identifier 230 analyzes the audio sensor data 222 to identify the audio (e.g., voice commands) captured by the audio sensor(s) 128. The interaction identifier 230 analyzes the biosensor data 224 to identify features of, for instance, the EMG and/or EEG signal data collected by the biosensor(s) 130 such as amplitude and frequency of the signal data. In some examples, the interaction identifier 203 analyzes sensor data 220, 222, 224 that has been filtered by the filter 228 to remove noise and/or data from frequency bands not of interest.

The interaction identifier 230 applies learned model(s) (e.g., the gesture model(s) 212, the audio model(s) 214, the biosensor model(s) 216) to determine the output(s) to be provided by the AR application 108 to cause the AR content 101 to respond as instructed by the user based on the user's interactions as represented the user's gestures, verbal commands, and/or biological activity (block 802). The output(s) can include manipulation of the AR content 101, selection(s) based on the AR content 101, adjustments to volume of audio AR content 101, etc.

In some examples, the interaction identifier 230 receives data from different types of sensors, such as two or more of the gesture detection sensor(s) 126, the audio sensor(s) 128, and/or the biosensor 130 (block 804). In such examples, the interaction checker 234 instructs the interaction identifier 230 to use data from one type of sensor, such as the biosensor(s) 130, to augment the analysis of the sensor data from another type of sensor, such as the gesture detection sensor(s) 126 (block 806). For example, the biosensor data 224 including nervous system data can be analyzed by the interaction identifier 230 in connection with the gesture sensor data 220 to augment the gesture sensor data 220 to determine that the user performed a fingertip gesture. In some examples, the interaction checker 234 confirms the output(s) determined by the interaction identifier 230 based on the learning models 212, 214, 216 by comparing the output(s) determined between the different models to verify that the analysis of the different sensor data is aligned with respect to the intended user interaction.

The example communicator 236 of FIG. 3 transmits instruction(s) 232 to the AR application 108 to implement the output(s) with respect to intended user interaction(s) with the AR content 101 (block 808). The example communicator 338 can communicate or interface with audio generators and/or graphic engines of a user device (e.g., the user device 110) to produce the AR content output(s).

The example AR interaction analyzer 138 continues to determine AR application output(s) in response to sensor data generated while the user 106 is wearing the wearable device 102 and interacting with the AR content 101 (block 810). The instructions of FIG. 6 end when no further stimulus input(s) are received by the AR interaction analyzer 138 (block 812).

Figure 9:
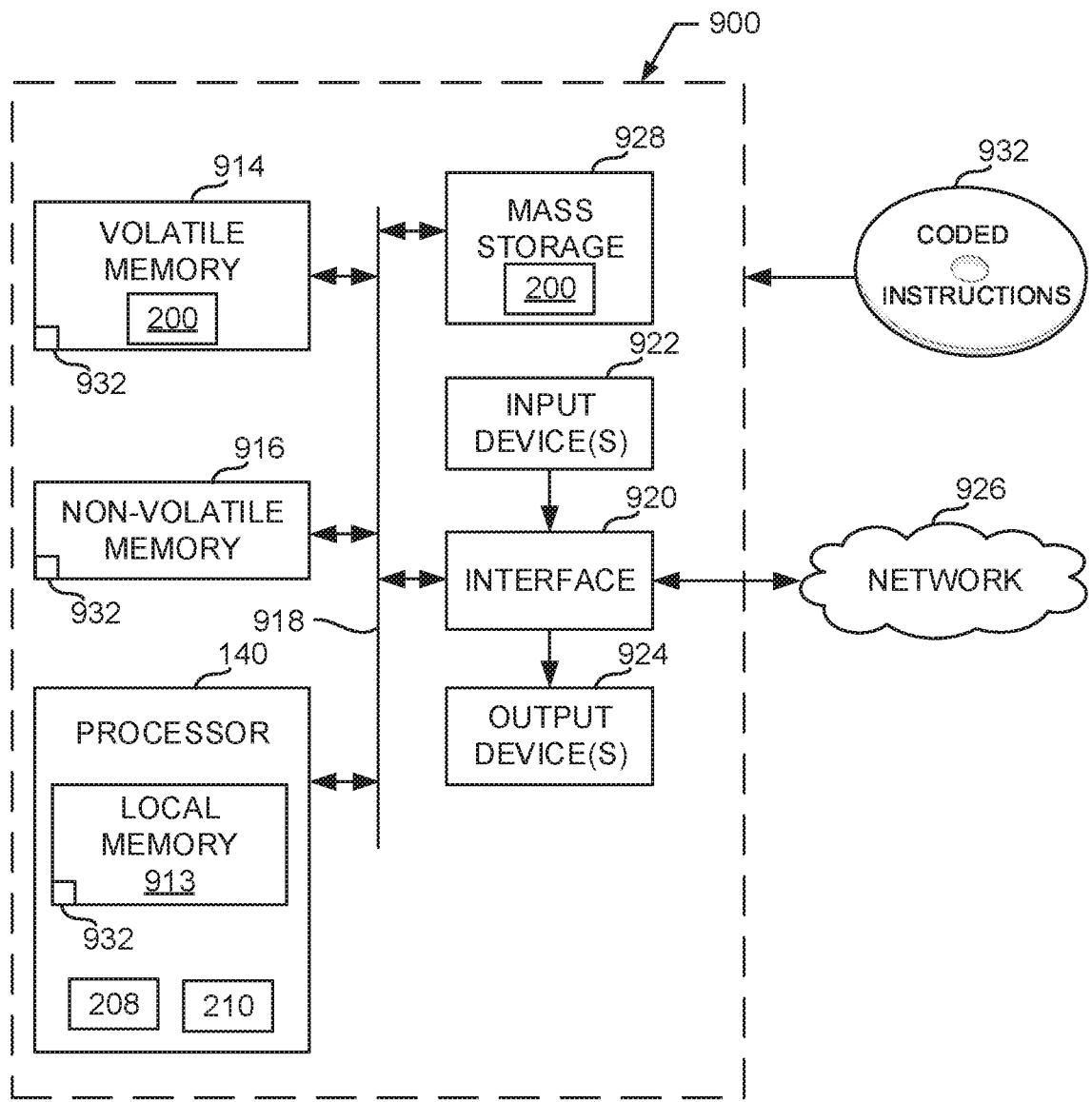
FIG. 9 is a block diagram of an example processing platform structured to execute the instructions of FIG. 7 to implement the example training manager of FIG. 2.

FIG. 9 is a block diagram of an example processor platform 900 structured to execute the instructions of FIG. 7 to implement the example training manager 140 of FIGS. 1 and/or 2. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a wearable device (e.g., a headset, a neck-worn device), or any other type of computing device.

The processor platform 900 of the illustrated example includes a processor 140. The processor 140 of the illustrated example is hardware. For example, the processor 140 can be implemented by one or more integrated circuits, logic circuits, microprocessors, GPUs, DSPs, or controllers from any desired family or manufacturer. The hardware processor may be a semiconductor based (e.g., silicon based) device. In this example, the processor executes the instructions represented by FIG. 7 to implement the example trainer 208 and the example machine learning engine 210.

The processor 140 of the illustrated example includes a local memory 913 (e.g., a cache). The processor 140 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 140. The input device(s) can be implemented by, for example, an audio sensor, a microphone, a camera (still or video), a keyboard, a button, a mouse, a touchscreen, a trackpad, a trackball, isopoint and/or a voice recognition system.

One or more output devices 924 are also connected to the interface circuit 920 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIG. 7 may be stored in the mass storage device 928, in the volatile memory 914, in the non-volatile memory 916, and/or on a removable non-transitory computer readable storage medium such as a CD or DVD.

Figure 10:
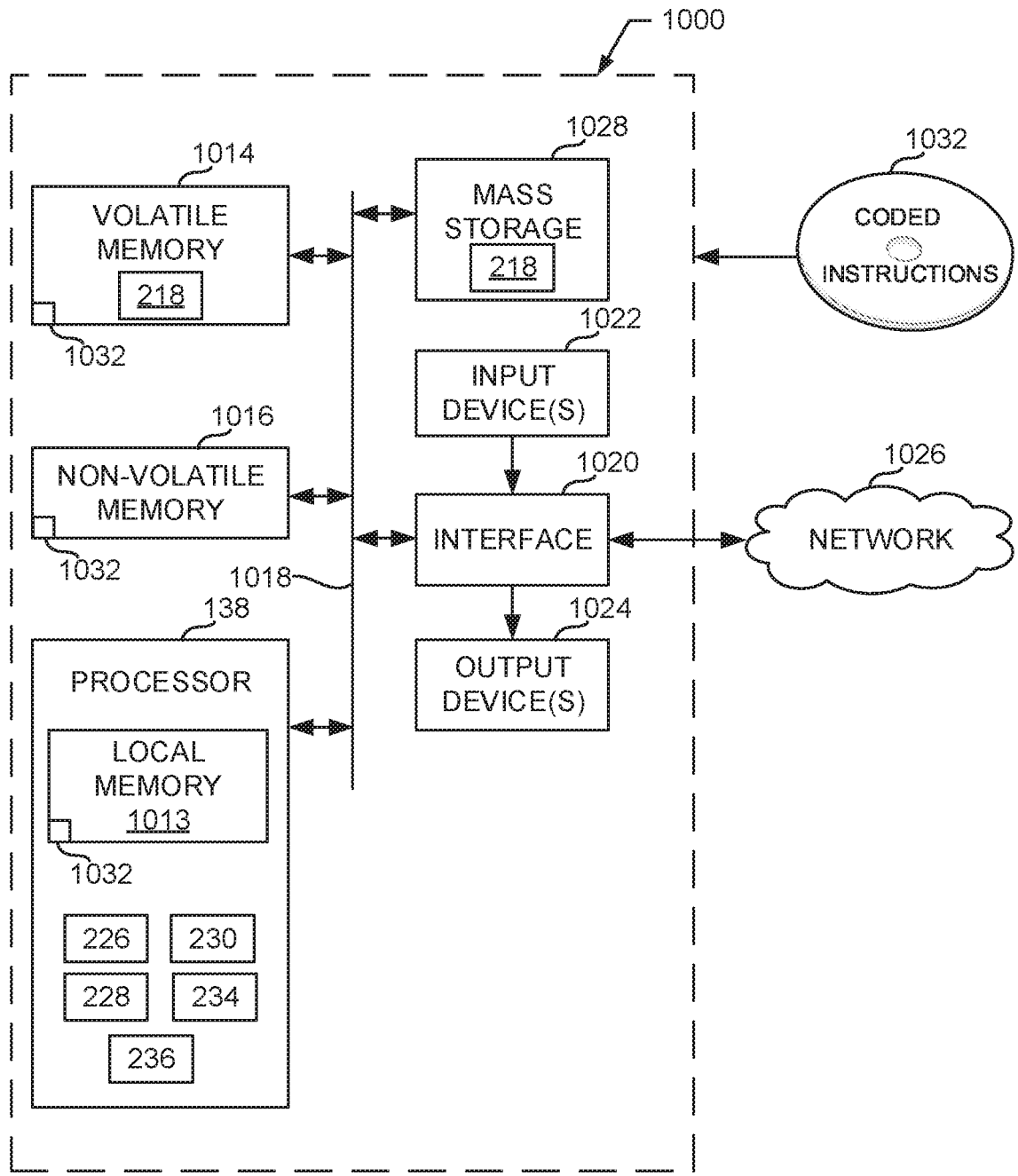
FIG. 10 is a block diagram of an example processing platform structured to execute the instructions of FIG. 8 to implement the example augmented reality interaction analyzer of FIG. 2.

FIG. 10 is a block diagram of an example processor platform 1000 structured to execute the instructions of FIG.

8 to implement the example AR interaction analyzer 138 of FIGS. 1 and/or 2. The processor platform 1000 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a gaming console, a wearable device (e.g., a headset, a neck-worn device), or any other type of computing device.

The processor platform 1000 of the illustrated example includes a processor 138. The processor 138 of the illustrated example is hardware. For example, the processor 138 can be implemented by one or more integrated circuits, logic circuits, microprocessors, GPUs, DSPs, or controllers from any desired family or manufacturer. The hardware processor may be a semiconductor based (e.g., silicon based) device. In this example, the processor executes the instructions represented by FIG. 8 to implement the example A/D converter 226, the example filter 228, the example interaction identifier 230, the example interaction checker 234, and the example communicator 236.

The processor 138 of the illustrated example includes a local memory 1013 (e.g., a cache). The processor 138 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 138. The input device(s) can be implemented by, for example, an audio sensor, a microphone, a camera (still or video), a keyboard, a button, a mouse, a touchscreen, a trackpad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIG. 8 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that provide for control of augmented reality (AR) content via a wearable device worn about a user's neck, thereby allowing the user to perform natural, unencumbered movements (e.g., hand gestures) to control the AR content. Unlike known AR controllers that may limit user interaction with AR content to touch screen inputs or control buttons on eyeglasses, example AR controllers disclosed herein provide for user interactions with AR content via gestures, audio, and/or biosensor data. Example AR controllers disclosed herein include a plurality of sensors that can be used to detect user movements, verbal commands, and/or biological data and generate instructions that cause AR applications to accurately implemented the intended user interactions with the AR content based on the sensor data.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The following is a non-exhaustive list of examples disclosed herein. Other examples may be included above. In addition, any of the examples disclosed herein can be considered whole or in part, and/or modified in other ways.

Example 1 includes a wearable device for controlling digital reality content including a frame sized to fit around a neck of a user and a first sensor coupled to a first portion of the frame. The first sensor is to generate biosensor data for the user wearing the frame. The example wearable device includes a second sensor coupled to a second portion of the frame. The second sensor is to generate second sensor data different from the biosensor data. One or more of the biosensor data or the second sensor data is to be used by a processor in communication with the first sensor and the second sensor to control the digital reality content.

Example 2 includes the wearable device as defined in example 1, wherein the first portion of the frame is a rear portion of the frame, the rear portion to be disposed proximate to a back portion of the neck of the user when the user is wearing the frame.

Example 3 includes the wearable device as defined in example 2, wherein the second portion of the frame is front portion of the frame opposite the rear portion.

Example 4 includes the wearable device as defined in examples 1 or 2, wherein the second sensor includes one or more of a motion sensor or a camera.

Example 5 includes the wearable device as defined in example 4, wherein the second sensor is a camera, the camera having a field of view directed away from a neck of the user.

Example 6 includes wearable device as defined in examples 1 or 2, wherein the second sensor includes an audio sensor.

Example 7 includes the wearable device as defined in examples 1 or 2, wherein the first sensor includes one or more of an electromyography sensor or an electroencephalography sensor.

Example 8 includes an apparatus including a first sensor to generate gesture data in response to a gesture performed by a user during exposure of the user to digital reality content, a second sensor to generate biological signal data from a neck region of the user during exposure of the user to the digital reality content, an interaction identifier to determine an interaction of the user relative to the digital reality content based on one or more of the gesture data or the biological signal data and a communicator to transmit an instruction to an output device cause a change in the digital reality content based on the interaction.

Example 9 includes the apparatus as defined in example 8, wherein the interaction identifier is to determine the interaction based on the gesture data and the biological signal data.

Example 10 includes the apparatus as defined in examples 8 or 9, wherein the interaction identifier is to determine the interaction based on a machine learning model.

Example 11 includes the apparatus as defined in example 10, further including a trainer to tune the machine learning model based on the biological signal data.

Example 12 includes the apparatus as defined in example 8, wherein the first sensor includes a camera and the gesture data includes image data.

Example 13 includes the apparatus as defined in example 8, wherein the biological signal data is generated in response to muscle activity by the user.

Example 14 includes the apparatus as defined in any of examples 8, 9, or 12, further including an interaction checker. The interaction identifier is to determine the interaction based on the gesture data and confirm the determination of the interaction based on the biological signal data.

Example 15 includes at least one non-transitory computer readable storage medium including instructions that, when executed, cause a machine to determine a user interaction with digital reality content based on first sensor data generated during exposure of a user to the digital reality content. The first sensor data is indicative of a gesture performed by the user. The instructions cause the machine to verify the user interaction based on second sensor data generated from a neck region of the user and activate an output device to generate a response to the user interaction.

Example 16 includes the at least one non-transitory computer readable storage medium as defined in example 15, wherein the first sensor data includes motion sensor data.

Example 17 includes the at least one non-transitory computer readable storage medium as defined in example 15, wherein the second sensor data includes one or more of electromyography data or electroencephalography data.

Example 18 includes the at least one non-transitory computer readable storage medium as defined in example 15, wherein the instructions, when executed, further cause the machine to determine the user interaction based on a machine learning model.

Example 19 includes the at least one non-transitory computer readable storage medium as defined in example 15, wherein the instructions, when executed, further cause the machine to tune the machine learning model based on one or more of the first sensor data or the second sensor data.

Example 20 includes the at least one non-transitory computer readable storage medium as defined in example 15, wherein the instructions, when executed, further cause the machine to filter the second sensor data.

Example 21 includes an apparatus including means for detecting a gesture performed by a user during exposure of the user to augmented reality content. The means for detecting is to generate first sensor data. The apparatus includes means for detecting biological signal data associated with the user during exposure of the user to the augmented reality content and means for determining an interaction of the user with the augmented reality content based on at least one of the means for detecting the gesture or the means for detecting the biological signal data. The means for determining is to instruct a user device to generate an output with respect to the augmented reality content based on the interaction.

Example 22 includes the apparatus of example 21, wherein the means for detecting the gesture and the means for detecting the biological signal data are coupled to a wearable device.

Example 23 includes the apparatus of example 22, further including means for detecting a verbal command by the user coupled to the wearable device.

Example 24 includes the apparatus of example 22, wherein the means for determining is to determine the interaction at the wearable device.

Example 25 includes the apparatus of example 21, further including means for training the means for determining.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A wearable device for controlling at least one of virtual reality content or augmented reality content, the wearable device including:
    a frame sized to fit around a neck of a user, the frame including a first portion having a first surface and a second portion having a second surface, the second portion positioned opposite the first portion, the second surface disposed at an angle relative to the first surface, the second surface to face away from the neck of the user when the user is wearing the frame;

a first sensor coupled to the first surface of the first portion of the frame, the first sensor to generate biosensor data for the user wearing the frame, the first portion of the frame to be disposed proximate to a back portion of the neck of the user when the user is wearing the frame; and a second sensor coupled to the second surface of the second portion of the frame, the second sensor to generate second sensor data different from the biosensor data, one or more of the biosensor data or the second sensor data to be used by a processor in communication with the first sensor and the second sensor to determine an interaction of the user relative to the at least one of the virtual reality content or the augmented reality content and to control the at least one of the virtual reality content or the augmented reality content in response to the interaction.

2. The wearable device as defined in claim 1, wherein the first portion of the frame is a rear portion of the frame and the second portion of the frame is a front portion of the frame opposite the rear portion.

3. The wearable device as defined in claim 1, wherein the second sensor includes one or more of a motion sensor or a camera.

4. The wearable device as defined in claim 3, wherein the second sensor is a camera, the camera having a field of view directed away from the neck of the user.

5. The wearable device as defined in claim 1, wherein the second sensor includes an audio sensor.

6. The wearable device as defined in claim 1, wherein the first sensor includes one or more of an electromyography sensor or an electroencephalography sensor.

7. The wearable device as defined in claim 1, wherein the first portion of the frame is to at least partially rest on the neck of the user when the user is wearing the frame.

8. The wearable device as defined in claim 1, wherein the frame further includes a third surface spaced apart from the second surface, the third surface to face away from the neck of the user when the user is wearing the frame, and further including:

a third sensor coupled to the third surface, the third sensor to generate third sensor data, at least one of the second sensor data or the third sensor data to include gesture data indicative of one or more gestures performed by the user.

9. An apparatus comprising:

a first sensor to generate gesture data in response to a gesture performed by a user during exposure of the user to at least one of virtual reality content or augmented reality content;

a second sensor to generate biological signal data from a neck region of the user during exposure of the user to the at least one of the virtual reality content or the augmented reality content;

an interaction identifier to:
identify one or more gestures based on the gesture data; and
determine a first interaction of the user relative to the at least one of the virtual reality content or the augmented reality content based on the one or more gestures;

an interaction checker to confirm the determination of the first interaction by:
determining a second interaction of the user relative to the at least one of the virtual reality content or the augmented reality content based on the biological signal data; and
performing a comparison of the first interaction to the second interaction; and a communicator to transmit an instruction to an output device to cause a change in the at least one of the virtual reality content or the augmented reality content based on the first interaction.

10. The apparatus as defined in claim 9, wherein the interaction identifier is to determine the first interaction based on a machine learning model.

11. The apparatus as defined in claim 10, further including a trainer to tune the machine learning model based on the biological signal data.

12. The apparatus as defined in claim 9, wherein the first sensor includes a camera and the gesture data includes image data.

13. The apparatus as defined in claim 9, wherein the biological signal data is generated in response to muscle activity by the user.

14. The apparatus as defined in claim 9, wherein the biological signal data is to be generated in temporal proximity to the gesture data.

15. At least one non-transitory computer readable storage medium comprising instructions that, when executed, cause a machine to:

identify a gesture performed by a user based on first sensor data generated during exposure of a user to at least one of virtual reality content or augmented reality content;

determine a first user interaction with the at least one of the virtual reality content or the augmented reality content based on the gesture;

verify the first user interaction by:
determining a second user interaction with the at least one of the virtual reality content or the augmented reality content based on second sensor data generated from a neck region of the user; and
performing a comparison of the first user interaction to the second user interaction; and activate an output device to generate a response to the first user interaction.

16. The at least one non-transitory computer readable storage medium as defined in claim 15, wherein the first sensor data includes motion sensor data.

17. The at least one non-transitory computer readable storage medium as defined in claim 15, wherein the second sensor data includes one or more of electromyography data or electroencephalography data.

18. The at least one non-transitory computer readable storage medium as defined in claim 15, wherein the instructions, when executed, further cause the machine to determine the first user interaction based on a machine learning model.

19. The at least one non-transitory computer readable storage medium as defined in claim 18, wherein the instructions, when executed, further cause the machine to tune the machine learning model based on one or more of the first sensor data or the second sensor data.

20. The at least one non-transitory computer readable storage medium as defined in claim 15, wherein the instructions, when executed, further cause the machine to filter the second sensor data.

21. The at least one non-transitory computer readable storage medium as defined in claim 15, wherein the second sensor data is generated in temporal proximity to the first sensor data.

* * * * *